March 4, 1958 W. HAUSZ 2,825,753

COLOR TELEVISION SYSTEMS EMPLOYING ALTERNATING LOW-FREQUENCY COMPONENTS

Filed March 17, 1951 4 Sheets-Sheet 1

Inventor:
Walter Hausz,
by Morton D. Morse
His Attorney.

Inventor:
Walter Hausz,
by Merton D. Morse
His Attorney.

March 4, 1958 W. HAUSZ 2,825,753

COLOR TELEVISION SYSTEMS EMPLOYING ALTERNATING LOW-FREQUENCY COMPONENTS

Filed March 17, 1951 4 Sheets-Sheet 3

Inventor:
Walter Hausz,
by Merton D. Morse
His Attorney.

March 4, 1958 W. HAUSZ 2,825,753

COLOR TELEVISION SYSTEMS EMPLOYING ALTERNATING LOW-FREQUENCY COMPONENTS

Filed March 17, 1951 4 Sheets-Sheet 4

Inventor:
Walter Hausz,
by Merton D Morse
His Attorney.

United States Patent Office 2,825,753

Patented Mar. 4, 1958

2,825,753

COLOR TELEVISION SYSTEMS EMPLOYING ALTERNATING LOW-FREQUENCY COMPONENTS

Walter Hausz, Syracuse, N. Y., assignor to General Electric Company, a corporation of New York Application March 17, 1951, Serial No. 216,205

13 Claims. (Cl. 178—5.2)

My invention relates to new and improved systems for transmitting and receiving television or facsimile images in natural colors, and it has for a main object the transmission and reproduction of a high-quality colored television picture within the same technical standards which have been established in the United States for the transmission and reproduction of black-and-white, or monochrome, pictures.

According to current television broadcasting standards in the United States for monochrome picture transmission, the televised scene is sequentially scanned from left to right and from top to bottom in a series of narrow horizontal lines, in a manner analogous to the way the eye of a reader scans a page of printed material. Each complete scan of the scene to be transmitted, or picture frame, requires the scanning spot at the transmitter or receiver to traverse 525 horizontal scanning lines across the scene within 1/30 second. To reduce flicker, double interlace is employed; i. e., 262½ "odd lines" are first scanned within 1/60 second, constituting one picture field, and the remaining 262½ "even lines" are scanned during the next picture field to complete the frame. Thus, the horizontal scanning rate is 15,750 lines per second, and the vertical scanning rate is 60 fields per second. As is well known to those skilled in the art, various blanking and synchronizing pulses are also inserted at these same rates at the ends of the scanning lines and picture fields. The composite television picture signal, as above described, is modulated upon a picture carrier wave, and any accompanying sound signals are modulated upon a second carrier wave spaced 4.5 mc. above the picture carrier. The two carriers and their sideband components are required to be transmitted within a channel having a total bandwidth of 6 mc., approximately 4.75 mc. being devoted to the transmission of the picture signal components. By employing unsymmetrical or vestigial transmission of the picture signal sidebands, a total range of picture signal components up to about 4 mc. can be transmitted. This range of frequencies has been found to be adequate for acceptable resolution of the picture detail in the reproduced image.

As of this date, no final standards of transmission have yet been established in the United States for the transmission and reception of television images in colors which are comparable to those for monochrome operation. However, due to the tremendous investments which have been made in television transmitters and television broadcast receivers for monochrome operation, it is highly desirable, if not almost essential, that any standards adopted for color television be such as to render as little existing equipment obsolete as possible. To this end, color television transmission should ideally be capable of accomplishment within essentially the same standards as those already established for monochrome transmission, or at least be compatible with present standards. That is, the standards for color transmission should be such as to permit a conventional monochrome receiver to reproduce a satisfactory black-and-white image in response to receipt of a color signal. This immediately creates technical difficulties, because it is generally agreed that picture signals representative of at least three different color components must be transmitted for production of high-quality color pictures. These are commonly designated as the green, red, and blue picture signals, and they will be so designated for convenience in the following specification, although those skilled in the art of colorimetry will understand that the three additive primary color components are usually a green, a red-orange, and a blue-violet and that other color coordinates formed as linear combinations of these three primary colors may also be employed.

Thus far, the systems which have been developed for color television may be broadly placed in two classes: (1) those in which the signals representative of the different color components are transmitted in a predetermined time sequence by time division multiplex techniques, and (2) those in which the signals representative of the different color components are transmitted simultaneously over different frequency channels.

The first class includes systems of the so-called "field sequential" type in which interlaced picture fields are sequentially transmitted in the different colors, of the "line sequential" type in which interlaced scanning lines are sequentially transmitted in the different colors, and of the "dot sequential" type in which the small, individual picture elements are sampled in the different colors in a predetermined sequence and then sequentially transmitted.

In all such color television systems, the common problem is presented of transmitting as much picture detail as possible within a transmission channel of predetermined bandwidth. With most of the various sequential systems heretofore proposed, it has been possible to transmit an adequate range of picture frequency components within the band now allotted for monochrome transmission, at the expense of reducing the effective field repetition rate. This gives rise to flicker, color smearing, and other undesirable effects, to a greater or less degree.

The simultaneous type of transmission permits all three color components to be transmitted at the same repetition rate, but has generally required a much greater bandwidth for the acceptable reproduction of picture detail. In simultaneous color television systems developed some years ago, bandwidths of from 12 to 16 mc. were employed, but in recent years a considerable reduction in bandwidths has been achieved, without objectionable loss of picture detail, through the use of the "mixed highs" principle. This will not be described herein in complete detail, since it is well known to those skilled in the art and described in the literature. See for example the textbook entitled "Radio Engineering" by F. E. Terman, pages 854–856 (McGraw-Hill, 3rd ed., 1947) and U. S. application, Serial No. 714,750, filed December 7, 1946, by Alda V. Bedford for "Simultaneous Multi-color Television," now Patent 2,554,693, granted May 29, 1951.

Very briefly, the "mixed highs" system is based on the premise that it is not necessary to transmit a full frequency range of video or image signal components for each of the three component colors in order to obtain an image which is satisfactory to the eye. The green signal is transmitted with a substantially full range of components extending up to approximately 4 mc., and it has mixed with it the higher frequency components of the red and blue signals. The higher frequency components, or "highs," of all three signals comprise the "mixed highs." Only the lower frequency components, or "lows," of the red and blue signals are then transmitted on separate bands, which need not be as wide as the band required for the green signal. At the receiver, equal portions of the mixed highs from the green signal are impressed on each of the three cathode ray systems employed to reproduce the color images, and only the lows are impressed on the respective systems individually. The net result is that the lows in the three color signals are reproduced in their respective colors in the composite color image, while the mixed highs are simultaneously reproduced in all three colors so as to cause the fine detail of the image to appear in shades of gray. The technique is similar to that employed in color printing, in which the fine detail of the image is carried by the so-called "black printer," only the broader details being printed in colors. However, the effect upon the eye of the observer is not substantially different from that obtained when all three complete bands of color components are transmitted and reproduced separately, thus allowing a substantial reduction in bandwidth for the same apparent picture detail.

The exact line of frequency division between the lows and highs of each color video or image signal has been found not to be particularly critical. The eye is most sensitive to the green component, and it is much less sensitive to the red and blue components. It has been found that only those frequency components of the red and blue signals below approximately 1 mc. in frequency are needed for good color rendition. In fact, the frequency range of the transmitted blue components can be as low as .2 mc. or even lower. A good practical average for the upper limit of the red and blue lows might be in the neighborhood of .5 mc., for example.

Using these known techniques to reduce the bandwidths of the several component signals as much as possible, the problem still remains as to how to transmit the three resultant color signals more efficiently; i. e., (1) the green lows plus the mixed highs, (2) the red lows, and (3) the blue lows. Within the scope of the problem is the attainment of an optically satisfactory balance of the horizontal and vertical resolution of the scanned scene with reference to the various hues and to the brightness within any given set of imposed standard rates, and in particular, according to current television broadcasting standards.

It is therefore a primary object of the present invention to furnish a relatively simple color television system, offering increased utilization of a limited band of operating frequencies for representing the chromaticity and brightness details in an optimum optical balance.

According to my invention, the lower frequency components of the red and the blue image signals (red and blue lows) corresponding to certain selected scanning lines or groups of scanning lines are transmitted in each scanned field in a predetermined alternating sequence simultaneously with the continuous transmission of the lower frequency components of the green image signals (the green lows) and the mixed higher frequency components of the green, red and blue image signals (the mixed highs). In a receiver, the green lows and mixed highs are continuously reproduced as the corresponding components of the composite image and the low frequency red and blue components are alternately reproduced in each field, the lines of the red and blue images being adjusted, as will be more particularly described, to fill out their respective frames.

The advantages of such a color television system embodying my invention, which may be referred to, in brief, as an alternating lows color television system, thus become apparent in that simultaneous transmission of only two color image signals is required, while as to the time-divided red and blue lows, the advantages of a line sequential, rather than field sequential system, are preserved. Since the human eye does not require the same amount of color information for each of the primary colors of a color television system for satisfactory resolution, a satisfactory optical effect is produced with much less red or blue information than green, and, going further, with less blue information than red. By placing the red and blue information on a time sharing basis, more of the frequency band can be devoted to the detail brightness information carried by the mixed highs. It is accordingly entirely feasible to transmit and receive a color television signal within the frequency bands now set for monochrome broadcasting and yet receive a very satisfactory visual image.

It is therefore apparent that it is an object of my invention to provide an improved multiplex facsimile system, and more specifically a color television system, which is particularly adapted for effective operation within a relatively narrow frequency channel.

Another object of my invention is to provide an improved color television or multiplex facsimile system in which a better balance of color and brightness fidelity is achieved, thereby decreasing the time during which certain signals are transmitted in accordance with the ability of the eye to resolve the colors corresponding to those signals.

More specifically, it is an object of my invention to provide an improved color television system in which the scene to be transmitted and reproduced is analyzed into three main bands of frequency components which conjointly define the color characteristics of the scene, and in which the higher frequency components of all bands are transmitted and received simultaneously whereas certain low frequency components are sampled and transmitted and received sequentially.

For additional objects and advantages, and for a better understanding of my invention, attention is now directed to the following detailed description and accompanying drawings. The features of my invention believed to be novel are also particularly pointed out in the appended claims.

Figure 1:
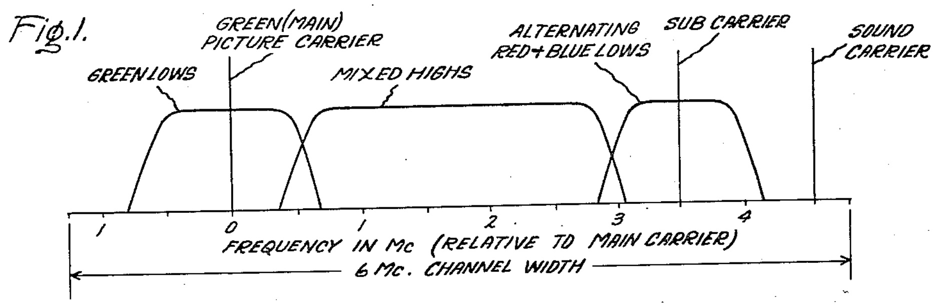
Fig. 1 is a simplified representation of a frequency spectrum occupied by a color television signal and accompanying sound signal transmitted in accordance with the principles of my invention.

In the several figures of the drawings, corresponding elements have been indicated by corresponding reference numerals to facilitate comparison, and those circuit elements which may in themselves be entirely conventional and whose details form no part of the present invention have been indicated in simplified block form with appropriate legends.

Figure 2:
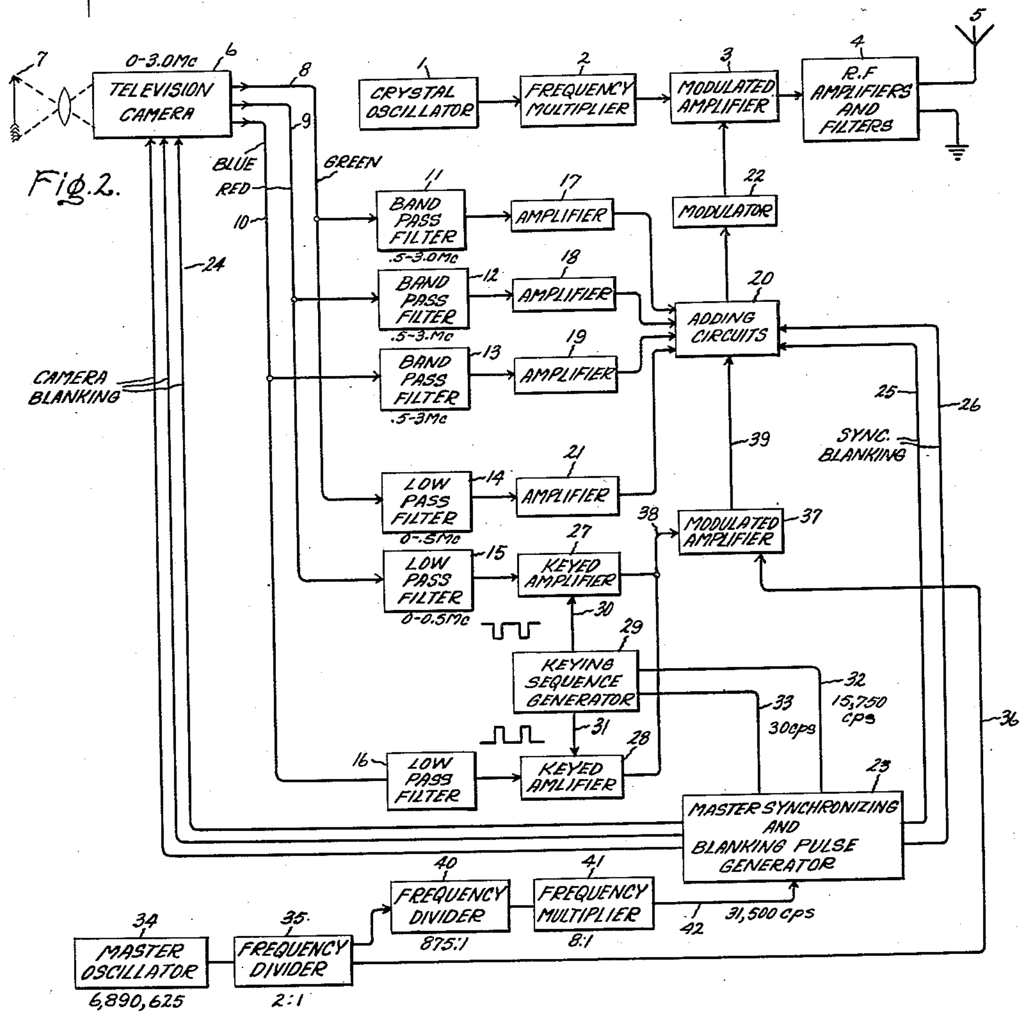
Fig. 2 is a one-line block diagram of a color television transmitter embodying my invention for radiating signals having the characteristics illustrated in Fig. 1.
Figure 3:
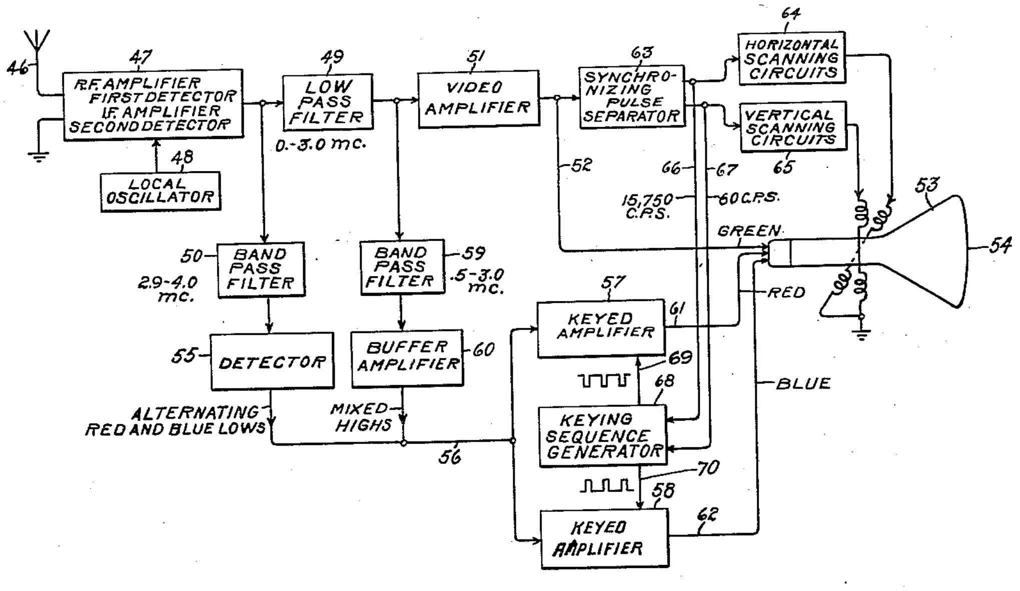
Fig. 3 is a one-line block diagram of a color television receiver constructed to receive and reproduce the colored scene in response to signals received from the transmitter of Fig. 2.

A system incorporating my invention is illustrated by Figs. 1 to 3, and, the following paragraphs describe in detail apparatus for both transmitting and receiving color television signals. The particular equipment shows as a preferred embodiment a system in which the green lows and mixed highs are transmitted continuously and the red and blue lows are transmitted in an alternating line sequence on a subcarrier. The equipment as shown is adapted to operate within the present standard channel width and to employ the line and field scanning frequencies standardized for monochrome television broadcasting. As such, it is fully compatible with present monochrome equipment.

The operation of the transmitter and receiver to be described is perhaps more readily understood by reference first to the representation of the frequency spectrum shown in Fig. 1. This shows a radiated picture carrier wave with its side band components, together with the usual modulated sound carrier within a standard 6 megacycle television broadcasting channel. The frequency spacings for the main picture carrier and the sound carriers are substantially in accordance with the present standards of transmission for monochrome signals in the United States, for example, as shown on page 843 of the previously mentioned textbook on "Radio Engineering" by Terman. This is standard vestigial side-band transmission for the picture carrier and its components. Thus, the green lows are indicated as being transmitted substantially as a double side band around a main carrier spaced 1.25 mc. from the lower edge of the channel while the mixed highs (the green, red and blue high frequency components) occupy a single side band from 0.5 mc. to 2.9 mc. using the main carrier as the zero reference frequency. For the transmission of the alternating red and blue lows, a subcarrier is amplitude-modulated alternately by the red and blue low frequency video signal components to produce double side bands. This subcarrier and modulation components are modulated on the main carrier as a single side band lying between the upper limit of the mixed highs side band and the sound carrier. As described in connection with the transmitter of Fig. 2, the subcarrier frequency is 3,445,312.5 C. P. S. higher than the main carrier. The sound system and its components are not further described since they are entirely conventional and represent a condition affecting the availability of frequencies within a standard band rather than an aspect of my invention.

Reference is now made to the color television transmitter illustrated schematically in Fig. 2. Since all of the individual circuit components and elements of this transmitter may be conventional and of various forms well known to those skilled in the art, they have been indicated in block form to simplify the drawing. The main carrier wave is derived in a conventional manner from a crystal oscillator 1 and frequency multiplier 2. It is amplitude-modulated by the various components of the composite picture signal in the modulated amplifier 3. The complete modulated carrier wave is then further conventionally amplified and also preferably passed through wave shaping filters as indicated by the block 4 before being impressed upon a suitable signal transmission channel by the antenna 5. The output filter characteristics are preferably such as to provide vestigial side-band transmission of the main carrier, as will be readily understood by those skilled in the art without detailed explanation. For those interested in further details of such filter designs, reference may be made, for example, to the article beginning at page 115 of the "Proceedings of the I. R. E.," March 1941, or to the article beginning at page 301 of the "RCA Review" January 1941.

The three-color picture signals are generated in a tricolor camera 6 which may be of any known type adapted to scan a colored scene or object 7 and to deliver three synchronized scannings outputs up to about 3 mc. in frequency, respectively representative of the green, red and blue color components of the scene. The camera 6 may, for example, comprise three separate camera pickup tubes, each provided with an appropriate color filter and arranged synchronously to scan the scene 7 in proper optical registry. A tricolor camera of the flying spot type might also be used, such as that described in the article appearing in the "Proceedings of the I. R. E.," September 1947, at pages 862–870.

The green, red and blue picture or video signals generated in the camera 6 are respectively supplied over conductors 8, 9 and 10 to three pairs of high pass and low pass filters. The filters of each pair are designed to have substantially the same cutoff frequency, thereby to divide each picture signal into the lows and highs as previously described. This frequency is not particularly critical and is selected to provide a practical compromise between color and detail in the reproduced picture. It may, for example, lie anywhere between about .2 mc. and 1 mc. Thus, assuming that each of the three-color signals occupies a band of 0–3.0 mc., the three high pass or band pass filters 11, 12 and 13 may be designed to have pass bands of .5–3.0 mc. and the low pass filters 14, 15 and 16 may be designed to have pass bands of about 0–.5 mc. The filters are preferably designed to have cutoff characteristics which are not too abrupt, in order to hold "ringing" transients to a minimum, for reasons well known to those skilled in the art. They should also be nearly complementary so that the overall band pass characteristics of each pair of filters approximates that of the impressed camera picture signal.

The outputs of the green, red and blue high pass filters 11, 12 and 13 are respectively supplied to amplifiers 17, 18 and 19 and from there to suitable adding or added circuits 20 in which they are combined to form the mixed highs of the composite picture signal. Various suitable types of circuits for this purpose are known to the art, a simple type of circuit, for example, consisting of a plurality of amplifier tubes whose anodes are connected together across a common output load impedance but whose indiivdual control grids are energized separately from the input signals. While the adding circuits might also be called mixers, the nomenclature applied is selected to emphasize the fact that the various outputs are added linearly rather than modulated as the term "mixing" sometimes suggests.

The green lows output from the low pass filter 14 is also supplied to its amplifier 21 and then additionally added to the mixed highs in the adding circuits 20 as shown. The splitting of the green signal into highs and lows and then recombining them in the adding circuits 20 facilitates independent adjustment of the amplitudes of the several color components in order to obtain the desired color balance in the composite signal and reproduced picture. It is not essential, however, and the green signal does not necessarily have to be separated into high and low frequency components.

The green lows and mixed highs output of the adding circuits 20 contain all the video information transmitted on the main carrier side bands. The red and blue lows are also added in a manner to be described shortly to complete the picture information. Synchronizing pulses and blanking pedestals are also mixed with the composite video signal in the adding circuits 20 in a well known manner, and the composite wave is then supplied to a conventional modulator 22, whose output signal amplitude modulates the carrier wave in the modulated amplifier 3.

The usual pulse signals required for blanking and synchronizing the camera sweep circuits and for supplying the synchronizing pulses and blanking pedestals to video signal are generated in known manner in a master synchronizing and blanking pulse generator 23. Thus, camera blanking signals are indicated as being supplied to the camera 6 over the three conductors 24, and the synchronizing and blanking pulses are indicated as being supplied to the adding circuits 20 over the conductors 25 and 26 respectively. The master pulse generator 23 also is designed to generate certain additional signals for reasons that will shortly become apparent.

In order to generate the alternating blue and red lows, the red lows and blue lows from the outputs of the low pass filters 15 and 16 are respectively coupled to keyed amplifiers 27 and 28. These amplifiers may be of any suitable types known to the art. For example, one common type comprises a pentode amplifier utilizing the sharp cutoff characteristic of the suppressor grid for keying. The signal to be amplified is impressed on the inner control grid and the keying or switching of the amplifier on and off is accomplished by means of rectangular pulses impressed upon the suppressor grid, which gates the tube by alternately rendering it conducting and non-conducting.

The keyed amplifiers 27 and 28 are rendered alternately conductive in order to pass video signals to their outputs by means of a pair of rectangular waves which have similar shapes but opposite polarities, supplied from a keying or switching sequence generator 29 over conductors 30 and 31, respectively. The wave forms are indicated adjacent the respective conductors 30 and 31 in subsequent reference.

To facilitate line sequence keying of the red low and blue low amplifiers 27 and 28, a 15,750 C. P. S. timing signal (horizontal line scanning frequency) is supplied to the keying generator 29 over a conductor 32 from the master pulse generator 23. Color switching between the red lows and the blue lows is provided at the ends of horizontal scanning lines in a predetermined line sequence. For purposes of illustrating a preferred embodiment, a desirable line sequence is two red lines to one blue line. Thus, the square wave patterns adjacent conductors 30 and 31 each have their opposite polarity amplitude levels in a 2 to 1 time ratio, corresponding to the respective periods of two and one cycles of the 15,750 C. P. S. timing signal. These square wave signals furnished to the keyed amplifiers are of opposite polarity, however, in order that one amplifier is keyed or switched on while the other is switched off. A 30 C. P. S. (frame frequency) overriding signal is furnished to the keying sequence generator from the master pulse generator 23 over conductor 33 in order to start the keying sequence generator in correct phase on each frame.

Referring still to Fig. 2, the subcarrier shown in Fig. 1 for the alternating red and blue lows is derived from a master oscillator 34. This may be adjusted, for example, to operate at a frequency of 6,890,625 C. P. S., which is the 875th multiple of one half the line scanning frequency (7,875 C. P. S.). This relationship offers some of the advantages of a frequency interlaced system, as described in an application by Robert B. Dome, Serial No. 176,405, filed July 28, 1950, now Patent No. 2,635,140, granted April 14, 1953, and assigned to the assignee of the present invention, in minimizing interference between the carrier and subcarrier side bands in case the filters do not wholly separate them. The oscillator frequency is halved in a frequency divider 35 and is supplied as the alternating lows subcarrier over conductor 36 to a modulated amplifier 37. There it is amplitude modulated by the alternating red and blue low frequency video components which are supplied from the key amplifiers 27 and 28 over a common conductor 38. The subcarrier and double side band output signal of the modulated amplifier is fed over conductor 39 to the previously-mentioned adding circuits 20 to form the complete composite video signal. The output of the adding circuits 20, as previously mentioned, thus contains the green lows and mixed highs plus the subcarrier modulated in alternating sequence by the red and blue lows. This output modulates the main carrier frequency in the modulated amplifier 3 as previously mentioned.

Frequency control for the master synchronizing and blanking pulse generator 23 is derived from the master oscillator 34 by means of a frequency dividing and multiplying chain comprising a frequency divider 40 and a frequency multiplier 41 connected in series to the frequency divider 35. The frequency divider 40 may suitably have a ratio of 875 to 1 (which is factored 5×5×5×7) and the frequency multiplier 41 may have an 8 to 1 ratio so that its output which is fed to the master pulse generator 23 over conductor 42 is the required 31,500 C. P. S. frequency (which is twice the horizontal synchronizing frequency of 15,750 C. P. S.).

A receiver adapted to receive the signals radiated by the transmitter of Fig. 2 is shown in the simplified one-line block diagram of Fig. 3. The front or input end of this receiver may be that of a conventional superheterodyne television receiver in which signals received on antenna 46 are amplified, converted to a lower intermediate frequency by mixing them with a local oscillator frequency, further amplified, and finally detected to reproduce the composite television picture signal as delivered to the modulator 22 of the transmitter of Fig. 2. To simplify the drawing, all these conventional functions are indicated schematically by the blocks 47 and 48.

The demodulated picture signal is impressed on two separate filters in parallel. One of these, a low pass filter 49, is designed to pass frequencies up to 3 mc., which frequencies include the demodulated green lows and the mixed highs. The other filter is a band pass filter 50 designed to pass frequencies from 2.9 mc. to 4.0 mc., which frequencies include the alternating lows subcarrier and the red and blue lows video signals alternately transmitted in time sequence on the subcarrier sidebands. The output of the low pass filter 49 is amplified by a conventional video amplifier 51 and supplied over a conductor 52 to that one of the three electron guns of a tricolor cathode ray picture tube 53 adapted to produce a green image on the viewing screen 54.

The picture tube 53 may be of any suitable known type, for example, the three-gun tube described in the magazine "Radio and Television News," June 1950, pages 46, 47 and 118 (and particularly shown in Fig. 1 of that article). Alternatively, it is, of course, possible to use three separate cathode ray tubes, each having a fluorescent screen adapted to produce an image in one of the desired colors, and to employ an optical system for superimposing the images for visual observation. Accordingly, in any reference herein to the image signals as reproduced on the green, red and blue screens, it is intended that either separate or combined screens may be considered, as the nature of the image reproduction means is not part of my invention.

The red and blue low frequency video components are derived in detector 55 which demodulates the signal from the band pass filter 50 containing the alternating lows subcarrier and its sidebands. The red and blue lows are then supplied over a common conductor 56 to keyed amplifiers 57 and 58. The amplifiers are keyed or switched on in sequence corresponding to the alternating lows keying sequence of the transmitted signal to provide lines or groups of lines of the red and blue lows respectively in time division sequence. In order that the mixed highs may also be added to the alternating lows, a band pass filter 59 is connected to the output of the low pass filter 49 previously mentioned, the filter 59 being designed to pass a band of frequencies approximately from 0.5 mc. to 3 mc. which band includes the mixed highs of Fig. 1. The mixed highs output signal is supplied to an amplifier 60 and then furnished to the keyed amplifiers 57 and 58 over common conductor 56. The outputs of the keyed amplifiers 57 and 58 are connected respectively by conductors 61 and 62 to those electron guns of the picture tube 53 which are adapted to produce the red and blue images on the viewing screen 54. It will be understood, of course, that the green, red and blue image responses on the respective screens or screen portions of the optical reproducer are suitably registered for color reproduction. The mixed green, red and blue high frequency components, or mixed highs, are continuously transmitted to the green screen and alternately to the red and blue screens, so that through persistence of vision the detail information provided by the mixed highs to the green, red and blue electron guns blends as grey detail on the viewing screen 54.

The synchronizing pulse components of the detected signal in the output signal of the amplifier 51 are separated out in a conventional manner in the synchronizing pulse separator 63 and utilized to synchronize the horizontal and vertical scanning circuits 64 and 65 of the picture tube 53 in a well-known manner.

Control of the keying sequence for the alternating lows is also derived from the output signals of the synchronizing pulse separator 63. Thus, pulses at the horizontal scanning rate frequency of 15,750 C. P. S. are carried over a conductor 66 from an input conductor of the horizontal scanning circuits 64, and 60 cycle pulses are carried over a conductor 67 from an input conductor of the vertical scanning circuits 65 to a keying sequence generator 68. Square wave blanking pulses are supplied from the keying generator 68 to the keyed amplifiers 57 and 58 over conductors 69 and 70, respectively. As indicated by the square wave form sketches shown adjacent conductors 69 and 70, the square waves of the blue and red keyed amplifiers are complementary on a time axis, that is, of opposite polarity, to render the amplifiers alternately conductive without a substantial time interval or overlap between the periods of operation of the respective amplifiers. The particular wave shapes shown correspond to the two red lines to one blue line preferred sequence of the transmitter of Fig. 2, and the reasons for the use of this sequence are explained in a following paragraph.

Inasmuch as only a fraction of the scanned lines per frame is transmitted and received in either red or blue, it is necessary to broaden the red and blue lines to prevent objectionable horizontal bar or line structure from appearing in an image reproduced on the viewing screen 54. A very simple method is to simply defocus the red and blue scanning beams of the picture tubes. Use of an elliptical scanning spot, with the major axis of the ellipse vertically aligned, is a desirable alternative as it avoids or minimizes loss of horizontal resolution. Such spots are readily obtained in picture tubes by such means, for example, as elliptical apertures in the electron guns or by control of the potential applied to vertical deflecting plates. Another means is by the application of a much high frequency deflecting signal to the vertical scanning circuits 65 of the red and blue electron guns of the picture tube. Due to persistence of vision, the rapidly deflected lines appear to be broadened.

In the operation of the system of Figs. 1, 2 and 3, the quality of the reproduced color image is satisfactorily achieved despite the limiting conditions imposed by monochrome broadcasting standards. Thus, broadening of the red and blue lines is employed to fill the red and blue frames and since the red and blue lines are substantially line interlaced rather than field interlaced (only single lines or small numbers of lines compared to the total number of lines per field are selected for each sequence) flicker is minimized. However, another problem, line crawl, and its solution remain to be described.

Use of a simple one red line to one blue line keying sequence, for example, results in the production of an optical phenomenon known as line crawl in the viewed image, unless additional means are utilized to avoid it. Due to the fact that an integral number of two-line sequences is not provided in the standard 525-line frame, the red and blue bars or lines are respectively vertically displaced by one line in successive fields of a frame, thus appearing to crawl down the rectangular scanning pattern, or raster. With a preferred keying sequence, such as that previously mentioned, where each complete keying group consists of two lines of red lows and one line of blue lows, or a total of three scanning lines, an integral number of complete groups is scanned in each picture frame when employing conventional 525-line double interlace. Under such conditions, the color distribution produced in a complete picture frame (two consecutive interlaced fields) is entirely symmetrical in its distribution of the color groups so that no apparent crawl results. Following the general rule that the sum of the number of red and blue lines in any one group shall be divisible in the number of lines per frame without remainder, a preferred group of scanning sequences in 525 lines scanning is seen to be those having either 3, 5 or 7 lines per group. These may be divided between the red and blue lines in any desired manner but since less information or resolution of the blue components than of the red (just as less is needed for the red than for the green) is required to meet the requirements of the human eye, and since the red phosphors are usually less satisfactory than the blue phosphors used in the fluorescent screens of present receiver picture tubes, it is usually more practical to select distributions which favor the red signal. Preferred combinations, with these limitations in mind, are two red lines and one blue line, three red lines and two blue lines, and four red lines with three blue lines. With any of the above combinations, the resultant color image is free from crawl. At the same time, since each partial color component of the scanned scene appears in each field, there is no objectionable flicker.

Modifications of the effective widths of the scanning beams of the red and blue tubes as previously mentioned seem desirable to prevent an undesirable line or bar structure in the reproduced pattern. Accordingly, with the above combinations, the respective beams preferably are broadened to the width of the number of colored lines in the keying group for filling out each red and blue colored frame without unequal overlap in successive frames. For example, when a two to one color switching ratio is employed, each red beam and each blue beam must have three times its normal width. Since vertical resolution is decreased as the line broadening ratio is increased, the three-line combination is preferred to the 5 or 7 line combinations.

Figure 4:
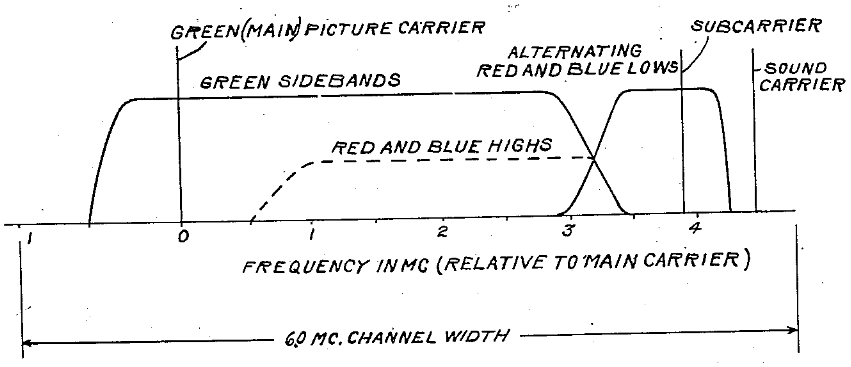
Fig. 4 is a conventionalized representation similar to that of Fig. 1 of the frequency spectrum of a television signal which is a modification of that represented by Fig. 1.
Figure 5:
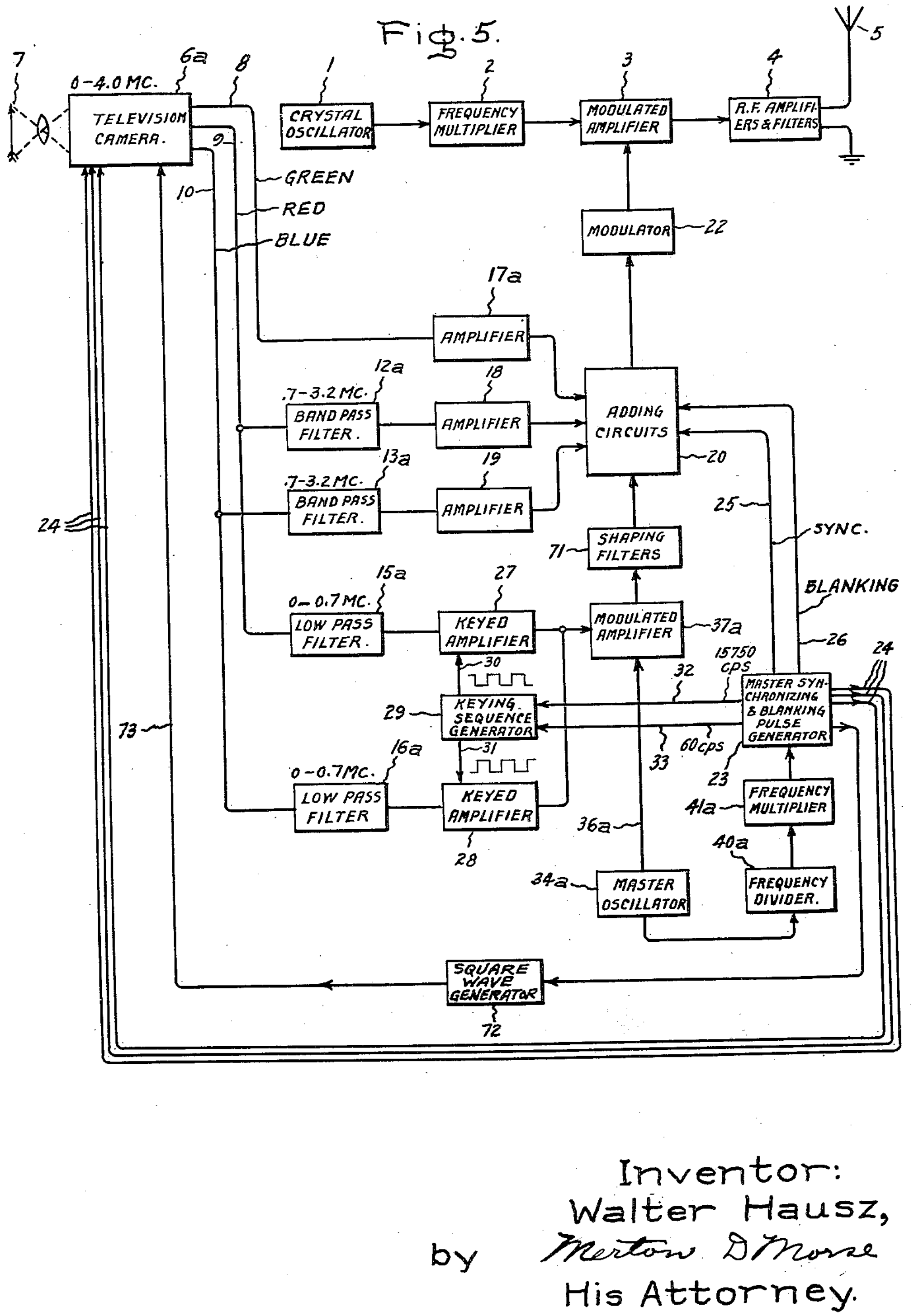
Fig. 5 is a one-line block diagram of another form of color television transmitter embodying my invention for radiating the signals represented in Fig. 4.
Figure 6:
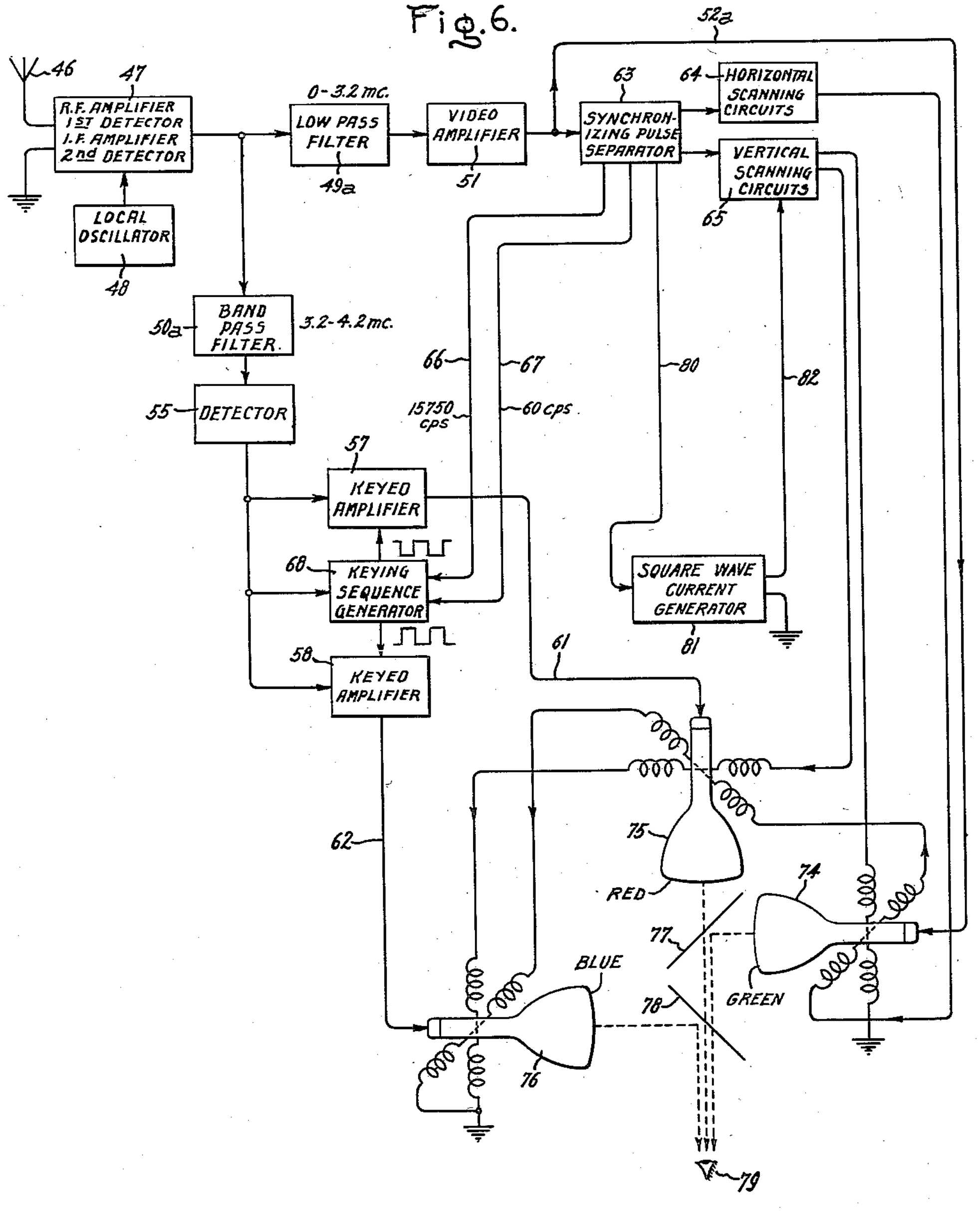
Fig. 6 is a one-line block diagram of another form of color television receiver for receiving and reproducing the color scene in response to signals received from the transmitter of Fig. 5.

A second system embodying my invention is illustrated by Figs. 4, 5 and 6 and described in the following paragraphs.

Fig. 4 is another conventionalized representation of a composite television signal similar to that of Fig. 1 but illustrating some alternative details. In this modification, the green lows and the mixed highs are modulated upon a main carrier spaced 1.25 mc. from the lower edge of a standard 6 mc. channel, the lows extending for approximately 0.7 mc. on either side of the carrier and the mixed highs extending from approximately 0.7 mc. to 3.2 mc. above the carrier. The alternating red and blue low frequency components are modulated upon a subcarrier 3,898,125 cycles above the main carrier with a full side band on the low frequency side of the subcarrier and vestigial side band on the high side. The sound carrier is not further described inasmuch as it is entirely conventional. One difference between this signal and that of Fig. 1 is the use of vestigial side band transmission for the alternating lows subcarrier to enlarge the range of frequencies available for both the lows and the mixed highs.

Fig. 5 is a block diagram of a suitable color television transmitter for radiating the signal of Fig. 4. Many of the component circuits, though, are the same as those previously described with reference to the transmitter of Fig. 2 and are therefore indicated by corresponding reference numerals without further description. Those elements of Fig. 5 which are not identical with those of Fig. 2 but whose functions are the same are also indicated by corresponding reference numerals with the suffix "*a*" added.

In the transmitter of Fig. 5, the green carrier is produced and modulated in substantially the same manner as previously described. The camera **6*a* produces a video signal having an upper frequency not less than 3.2 mc., but the mode of filtering the three-color signal components and of separating and of adding together the mixed highs is slightly modified with respect to that of Fig. 2. The green signal is not divided into low and high frequency components, and instead the complete green signal is amplified in video amplifier 17a and supplied directly to the adding circuits 20. No high and low pass green filters are required and one of the green video amplifiers is also omitted. In accordance with the frequency spectrum shown in Fig. 4, the band pass filters 12a and 13a for the red and blue high frequency components are designed to pass frequencies of approximately 0.7 to 3.2 mc., while the low pass filters 15a and 16a** for the low frequency components are designed to pass frequencies up to 0.7 mc.

Fig. 5 also illustrates another possible set of frequency relationships for the master oscillator and its associated frequency divider and frequency multiplier chain for obtaining suitable subcarrier and synchronizing frequencies. Thus, the master oscillator 34a may generate frequency of 3,898,125 C. P. S., which is used as the alternating lows subcarrier frequency, this being the 495th harmonic of 7,875 C. P. S. (one-half the horizontal scanning frequency). The output signal of the master oscillator is furnished over conductor 36a to the modulated amplifier 44 where it is amplitude-modulated by the alternating red and blue low signals. Shaping filters 71 between the amplifier 44 and adding circuits 20 function in well-known manner to provide a vestigial side band on the high frequency side of the subcarrier. By dividing a control signal from the master oscillator 34a in a ratio of 495 to 1 in frequency divider 40a and multiplying in a ratio of 4 to 1 in frequency multiplier 41a, the required 31,500 cycle frequency is obtained for the master synchronizing and blanking generator 23.

A feature of the transmitter of Fig. 5 for preventing line crawl in the images to be received and reproduced is the provision of means for jogging or vertically displacing the red and blue scanning beams in the camera 6a during alternate fields. Thus, to displace the lines of the even red and blue fields one line downward, a square wave generator 72, which may be a part of the master pulse generator 23 but which is separately indicated here, provides a 30 cycle square wave signal pulse of appropriate amplitude over conductor 73 to the color camera 6a, where the signal is superimposed upon the red and blue vertical deflection circuits. Each half wave has the same time duration, 1/60 of a second, as one field of a standard double interlaced frame, and hence the lines of every other field are jogged or displaced.

The keying sequence generator 29 of the transmitter of Fig. 5 is adjusted for a two-line sequence in which single lines of red and blue low signals are alternately transmitted. For such a sequence, the respective keying signals for the red and blue keyed amplifiers 27 and 28 are uniform square waves of polarity as indicated by the wave patterns adjacent the generator output conductors 30 and 31 in Fig. 5.

Referring now to Fig. 6, the receiver circuit shown there is quite similar to the receiver of Fig. 3, but is adapted for use with the transmitter of Fig. 5. As in the description of Fig. 5, most of the component circuits therein need no further description and are indicated by reference numerals corresponding to those of Fig. 3.

To illustrate the case of application of my invention to various television system components, three separate color tubes 74, 75 and 76, which are respectively green, red and blue tubes, are shown together with suitable optical means including, for example, selectively-transparent mirrors 77 and 78 for optically superimposing the red, green and blue picture images to recreate a composite color picture image as observed by the eye 79 of an observer. The low pass filter 49a for passing the demodulated green signal and mixed highs cuts off at approximately 3.2 mc. and band pass filter 50a has a pass band of 3.2 mc. to 4.2 mc. to pass the partially demodulated alternating lows. In this modification the mixed highs are supplied to the green tube 74 only. While presentation of the mixed high brightness detail in shades of green is somewhat less satisfactory than the presentation in gray, provided in the receiving system of Fig. 3, such a compromise is feasible and illustrative of available economy in receiver construction.

For elimination of red and blue line crawl in the reproduced image, line jogging is employed, corresponding to the jogging of the red and blue scanned lines in the transmitter camera 6a. A 60 C. P. S. vertical blanking pulse from the synchronizing pulse separator 63 is supplied over conductor 80 to a square wave current generator 81 which, in turn, supplies a 30 cycle square wave current over conductor 82 to the vertical scanning circuits 65. This square wave current is then added to vertical sweep current of the vertical deflecting coils of red and blue tubes 75 and 76, the current amplitude and phase being adjusted to vertically deflect or jog every even red and blue field one line downward. If a common vertical sweep system were to be alternatively employed for the green, red and blue electron scanning beams, additional electrostatic deflecting electrodes within the tube or tubes could be readily employed to jog the red and blue beams.

In operation, the system of Figs. 4, 5, and 6 utilizes the alternating lows as generally discussed in preceding paragraphs, and affords an illustration of additional means for removing undesired effects of the time-division multiplexing of the red and blue lows. With the single red line to blue line sequence example mentioned, the single line of red to single line of blue interlace in each field produces, before correction, both objectionable line structure and crawl in the red and blue frame of the reproduced image. By jogging every other field by one line in the transmitter camera and in the receiver picture tube as described, the red lines of the odd and even field of each frame are symmetrically spaced from each other and the blue lines are likewise spaced. Crawl is thus eliminated, since the lines are evenly distributed in each frame and consistent in position in successive frames. To smooth and fill out the red and blue frames, the red and blue lines need be broadened by only a 2 to 1 ratio. Defocusing of the red and blue electron beams to provide vertical broadening, as previously mentioned, is suitable for this purpose.

Line crawl in the 1 to 1 sequence may also be eliminated without jogging by such means as broadening each red or blue line by a 4 to 1 ratio. The crawl is removed because each field of each frame is filled out to eliminate line or bar structure, and successive fields when interlaced must necessarily exhibit no line structure. This approach to the problem, which may be referred to as full-field line broadening, requires a greater degree of line broadening and, hence, results in less vertical red and blue resolution than when the 2 to 1 line sequence is employed or when the 1 to 1 line sequence with jogging is utilized. However, it is obvious that various combinations of line sequences, jogging and full-field line broadening may be employed.

It is to be understood, of course, that in systems embodying my invention the various combinations of factors affecting color balance, such as the minimum intensity of the respective primary colors needed for satisfactory subjective appearance, the characteristics of the picture tube phosphors, and the circuits employed for amplitude or intensity control for the various color signals permit substantial latitude in the selection of alternating sequences. One limit is imposed by flicker, which requires that sufficient numbers of both red lines and blue lines be present in each field to portray the red and blue image with satisfactory completeness.

While I have shown how color television systems embodying my invention can utilize both the frequency channels and the line and field frequencies now standard for monochrome television broadcasting, it is obvious that the principles of my invention may be more widely applied. For example, still using the standard 525-line frame with two interlaced fields for the green signal and mixed highs, the red and blue signals may be time divided as desired in each field, and the red and blue line scanning rates are adjusted so that the raster is scanned during each field in the time allotted. This may be termed a split-field alternating sequence, since the red and blue information alternates at a fraction of the field rate rather than at a multiple of a line rate. It is still compatible with present monochrome equipment, since a monochrome receiver receiving the standard line-frequency green and mixed-highs signals on the main carrier for black and white reproduction is unaffected by the alternating red and blue lows, regardless of their respective scanning rates.

In summary, it is apparent that my method of providing an improved color television system through the principle of alternating lows combines desirable features of both simultaneous and sequential systems. Full advantage has been taken of the prior art techniques in the use of mixed highs, inasmuch as it has been apparent that only a small part of the limited 6 mc. bandwidth need necessarily be devoted to colors. Moreover, while utilizing the monochrome broadcasting standards, the more or less wasteful use of the full monochrome vertical resolution for color information is avoided, and more bandwidth is made available for the detail information which is satisfactorily and economically provided in monochrome by the mixed highs. No change in monochrome field and line rates is necessary to provide a composite color image without objectionable flicker and crawl and objectionable line structure have been avoided. While, of course, my invention may be utilized for more effective use of any given bandwidth and according to other broadcasting standards than those presently established in the United States for black and white television, embodiments described have illustrated a compatible system by which present receiving equipment may receive a satisfactory monochrome image from the green lows and mixed highs information.

While I have shown and described various specific embodiments of my invention, and certain modifications thereof, it will, of course, be understood by those skilled in the art that other modifications may be made without departing from the principles of the invention. I, therefore, contemplate by the appended claims to cover any such modifications as fall within the true spirit and scope of my invention.

What I claim as new and desire to secure by Letters Patent of the United States is:

1. In a multiplex television system, a plurality of camera means for synchronously scanning a scene at predetermined line and field scanning frequencies and for developing three partial picture signal frequency bands, each corresponding to a different optical characteristic of said scene, means for transmitting one of said frequency bands, keying means for alternately selecting time-interlaced line groups of the other two of said frequency bands during each scanning field, and means for transmitting said time-interlaced bands simultaneously with said one of said groups.

2. In a multiplex facsimile system, a plurality of camera means for synchronously scanning a scene at predetermined line and field scanning frequencies and for developing at least two partial picture signals, each corresponding to a different optical characteristic of said scene, frequency-selective means for subdividing each said signal into high frequency and low-frequency bands, means for combining and transmitting the portions of said signals within said high-frequency bands, keying means for alternately selecting a plurality of groups of integral lines of both said signals within each of said low-frequency bands during each scanning field, successive fields being relatively displaced in said camera means to provide symmetrical registry of said groups of lines in successive fields, and means for transmitting fields of said alternately selected line groups.

3. A tri-color television transmission system comprising tri-color camera means for scanning a scene at predetermined line and field scanning frequencies and for developing three corresponding partial picture signals, each said signal extending over a band of video frequencies respectively corresponding to a first, second and third primary color component of said scene, frequency-selective means for subdividing at least the second and third color bands into similar complementary high frequency and low-frequency sub-bands, means for adding said high-frequency sub-bands and said first color band to form a first composite picture signal, keying means for alternately selecting a plurality of integral line groups each comprising the signals within said second and third low-frequency sub-bands in alternating sequence during each scanning field, means for combining said selected line groups to form a second composite picture signal and means for simultaneously transmitting said first and second composite signals.

4. A color television transmission system comprising tri-color camera means for synchronously effecting double-interlaced scanning of a scene at predetermined line and field scanning frequencies and for developing three corresponding partial picture signals, each said signal extending over a band of video frequencies respectively corresponding to green, red and blue primary color elements of said scene, frequency-selective means for subdividing the red and blue bands into similar, complementary high-frequency and low-frequency sub bands, means for adding components of each of these signals lying within said red and blue high-frequency sub-bands and within the green band to form a first composite picture signal, keying means for alternately selecting time-interlaced portions of the components of each of these signals lying within said red and blue low-frequency sub-bands, each said portion corresponding to an integral number of scanning lines substantially less than the number of lines in a picture field, means for combining said selected portions to form a second composite picture signal, and means for simultaneously transmitting said composite signals.

5. A multiplex facsimile system comprising means for scanning a scene and for concurrently developing three image signals each corresponding to a different optical characteristic of said scene, frequency selective means for subdividing at least two of said signals into two substantially mutually exclusive bands of relatively low-frequency and high-frequency components, means for combining signal components of said two high-frequency bands and of said third signal to form a first composite picture signal, keying means for alternately selecting time-interlaced portions of the signals within said other two low-frequency bands in synchronism with the scanning of said scene, means for combining said selected portions to form a second composite picture signal, means for simultaneously transmitting and receiving said two picture signals, means for simultaneously transmitting and receiving a keying signal in synchronism with the operation of said keying means, means utilizing said received picture and keying signals to reproduce said composite picture signals, and a plurality of cathode ray scanning means utilizing said reproduced signals to produce a composite picture portraying said scene.

6. A multiplex color television transmitter comprising a plurality of camera means for synchronously effecting odd-line double-interlaced field scanning of a scene at predetermined line and field scanning frequencies and for developing at least three partial picture signals, each said signal extending over a band of video frequencies corresponding to a different color characteristic of said scene, frequency-selective means for subdividing at least two of said signals into similar, complementary high-frequency and low-frequency sub-bands, means for algebraically combining the signals within said high-frequency sub-bands and a third one of said signals to form a first composite picture signal, keying means for alternately selecting time-interlaced single lines of each of the signals within the said low-frequency sub-bands, means for combining said selected lines to form a second composite picture signal, means for cyclically displacing the positions of the interlaced fields of said two signals relative to each other in said camera means to provide symmetrical registry of the lines of two signals within said two said low-frequency sub-bands, and means for simultaneously transmitting said two composite picture signals.

7. A system for multiplexing three corresponding partial picture television signals, each signal extending over a band of video frequencies respectively corresponding to a first, second and third component color of a scene, comprising means for dividing at least the second and third color bands into substantially mutually exclusive high-frequency and low-frequency sub-bands, means for adding said high-frequency sub-bands and said first color band to form a first composite picture signal, keying means for alternately selecting portions of said second and third low-frequency sub-bands in an alternating sequence during each scanning field, means for combining said selected portions to form a second composit epicture signal, and means for simultaneously transmitting said first and second composite signals.

8. A multiplex color television receiver adapted for operation with the transmitter of claim 4, comprising means for separately detecting and reproducing each of said composite picture signals, three cathode-ray line scanning means having intensity control electrodes and ray deflecting means, said scanning means each being arranged to produce by successive lines of each field a fluorescent image in one of said green, red and blue primary colors, means for synchronizing the scanning of said three cathode ray means in unison with the scanning of said scene, means for impressing said first composite signal on the control electrode of at least said green scanning means, and means for alternately impressing said second composite signal on the control electrodes of said red and blue scanning means in synchronism with the transmission of the red and blue portions of said second signal.

9. A multiplex color television receiver adapted for operation with the transmitter of claim 4, comprising means for separately detecting and reproducing each of said composite picture signals, three cathode-ray line scanning means having intensity control electrodes and ray deflecting means, said scanning means each being arranged to produce by successive lines of each field a fluorescent image in one of said green, red and blue primary colors, means for synchronizing the scanning of said three cathode ray means in unison with the scanning of said scene, means for impressing said first composite signal on the control electrode of at least said green scanning means, means for alternately impressing said second composite signal on the control electrodes of said red and blue scanning means in synchronism with the transmission of the red and blue portions of said second signal, and means for broadening the lines producing the red and blue images.

10. A color television transmitter comprising tri-color camera means for synchronously effecting double-interlaced scanning of a scene at predetermined line and field scanning frequencies and for developing three corresponding partial picture signals, each said signal extending over a band of video frequencies respectively corresponding to three elemental colors of said scene, frequency-selective means for subdividing two of said signals into similar complementary high-frequency and low-frequency sub-bands, means for adding components of each of the signals lying within said high-frequency sub-bands to signal components lying within said third band to form a first composite picture signal, keying means for alternately selecting time-interlaced portions of the components of each of the signals lying within said low-frequency sub-bands, each said portion comprising substantially less than one picture field and corresponding to an integral multiple, including unity, of one scanning line, means for combining said selected portions to form a second composite picture signal, and means for simultaneously transmitting said composite signals.

11. A color television system comprising tri-color camera means for synchronously effecting double-interlaced scanning of a scene at predetermined line and field scanning frequencies and for developing three corresponding partial picture signals, each said signal extending over a band of video frequencies respectively corresponding to three elemental colors of said scene, frequency-selective means for subdividing two of said signals into similar complementary high-frequency and low-frequency sub-bands, means for adding components of each of the signals lying within said high-frequency sub-bands to signal components lying within said third band to form a first composite picture signal, keying means for alternately selecting time-interlaced portions of the components of each of the signals lying within said low-frequency sub-bands, each said portion comprising substantially less than one picture field and corresponding to an integral multiple, including unity, of one scanning line, means for combining said selected portions to form a second composite picture signal, means for simultaneously transmitting and receiving said two composite picture signals, means for detecting and reproducing said composite signals, three cathode-ray line scanning means having intensity control electrodes and ray deflecting means, said scanning means each being arranged to produce by successive lines of each field a fluorescent image in one of said elemental colors, means controlled by said signals for synchronizing the scanning of said three cathode-ray means in unison with the scanning of said scene, means for impressing said first signal on the control electrode of at least a first one of said scanning means, gating means controlled by one of said received signals for alternately impressing said second signal on the control electrodes of the second and third ones of said scanning means in synchronism with the alternations of said keying means, and means to broaden the widths of the lines produced by said second and third ones of said means so that the areas of their resultant fluorescent images are each comparable to the area of the image produced by said first one of said scanning means.

12. A multiplex color television receiver adapted for operation with the transmitter of claim 4 comprising means for detecting and reproducing said composite signals, three cathode-ray line scanning means having intensity control electrodes and ray deflecting means, said scanning means each being arranged to produce by successive lines of each field a fluorescent image in one of said elemental colors, means controlled by said signals for synchronizing the scanning of said three cathode-ray means in unison with the scanning of said scene, means for impressing said first signal on the control electrode of at least a first one of said scanning means, gating means controlled by one of said received signals for alternately impressing said second signal on the control electrodes of the second and third ones of said scanning means in synchronism with the alternations of said keying means, and means to broaden the widths of the lines produced by said second and third ones of said scanning means as compared to the widths of the lines produced by the first one of said scanning means.

13. A color television receiver adapted for operation with the transmitter of claim 6 comprising means for detecting and reproducing said composite signals, three cathode-ray line scanning means having intensity control electrodes and ray deflecting means, said scanning means each being arranged to produce by successive lines of each field a fluorescent image in one of said elemental colors, means controlled by said signals for synchronizing the scanning of said three cathode-ray means in unison with the scanning of said scene, means for impressing said first signal on the control electrode of at least a first one of said scanning means, gating means controlled by one of said received signals for alternately impressing said second signal on the control electrodes of the second and third ones of said scanning means in synchronism with the alternations of said keying means, and additional keying means controlled by one of said signals for cyclically displacing the fluorescent images produced by the second and third ones of said scanning means in synchronism with the displacement of the corresponding interlaced fields at the transmitter.

References Cited in the file of this patent

UNITED STATES PATENTS

| | | |
|---|---|---|
| 2,333,969 | Alexanderson | Nov. 9, 1943 |
| 2,335,180 | Goldsmith | Nov. 23, 1943 |
| 2,535,552 | Schroeder | Dec. 26, 1950 |
| 2,554,693 | Bedford | May 29, 1951 |
| 2,567,040 | Sziklai | Sept. 4, 1951 |
| 2,677,720 | Bedford | May 4, 1954 |
| 2,773,929 | Loughlin | Dec. 11, 1956 |

OTHER REFERENCES

"A Six-Megacycle Compatible High-Definition Color Television System," Television, volume VI, 1949–1950, pages 270–290, published by RCA Review.